(12) United States Patent
Wihlborg et al.

(10) Patent No.: US 7,973,513 B2
(45) Date of Patent: Jul. 5, 2011

(54) SYSTEMS AND METHODS FOR UBIQUITOUS CHARGING

(75) Inventors: Anders Wihlborg, Rydebäck (SE); Jonas Claesson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 914 days.

(21) Appl. No.: 11/930,882

(22) Filed: Oct. 31, 2007

(65) Prior Publication Data

US 2009/0108807 A1  Apr. 30, 2009

(51) Int. Cl.
H02J 7/00 (2006.01)
H04M 1/00 (2006.01)

(52) U.S. Cl. ........ 320/108; 320/114; 320/139; 455/573; 379/454

(58) Field of Classification Search .................... 320/115
See application file for complete search history.

(56) References Cited

U.S. PATENT DOCUMENTS

| | | | |
|---|---|---|---|
| 5,511,240 A * | 4/1996 | Nishiyama | 455/127.1 |
| 5,600,225 A * | 2/1997 | Goto | 320/108 |
| 6,803,744 B1 | 10/2004 | Sabo | |
| 7,002,609 B2 * | 2/2006 | Lewis | 347/129 |
| 7,263,388 B2 * | 8/2007 | Yamamoto | 455/573 |
| 2004/0082369 A1 * | 4/2004 | Dayan et al. | 455/573 |
| 2005/0139383 A1 | 6/2005 | Kent et al. | |
| 2006/0202665 A1 * | 9/2006 | Hsu | 320/139 |
| 2007/0279002 A1 * | 12/2007 | Partovi | 320/115 |

FOREIGN PATENT DOCUMENTS

| | | |
|---|---|---|
| DE | 40 11 198 A1 | 10/1991 |
| EP | 1 608 042 A1 | 12/2005 |
| WO | WO 2007/099412 A1 | 9/2007 |
| WO | WO 2007099412 A1 * | 9/2007 |

OTHER PUBLICATIONS

International Search Report and Written Opinion issued in corresponding international application No. PCT/IB2008/051641, mailed Jan. 26, 2009, 18 pages.

* cited by examiner

*Primary Examiner* — Edward Tso
*Assistant Examiner* — Yalkew Fantu
(74) *Attorney, Agent, or Firm* — R. Brian Drozd; Moore & Van Allen PLLC

(57) ABSTRACT

A device is provided that includes a battery, a positive node and a negative node and logic configured to send a first signal through the positive node into a charging surface; send a second signal through the negative node into the charging surface; receive current from the charging surface in response to the first and second signals; and charging the battery with the received current from the charging surface.

20 Claims, 11 Drawing Sheets

FIG. 4A
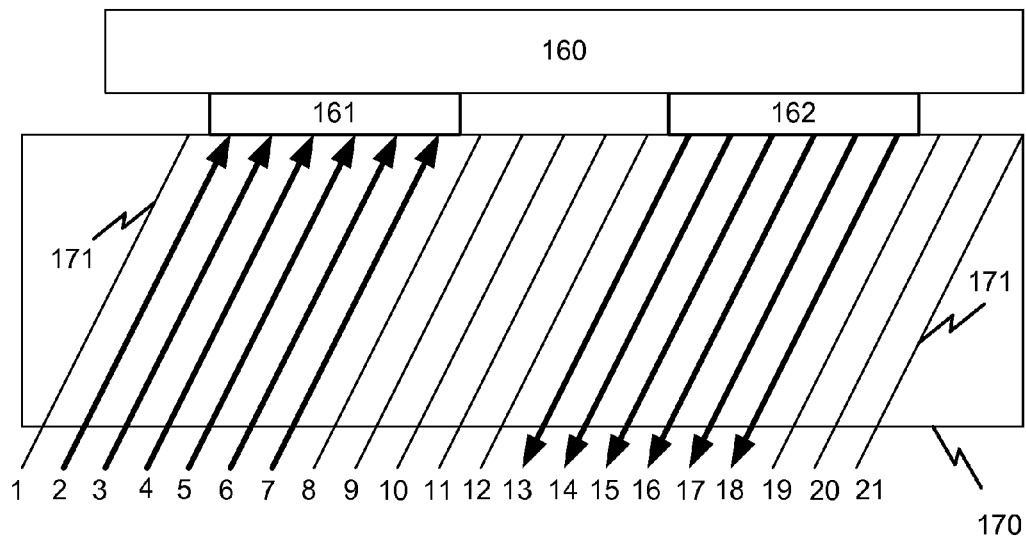
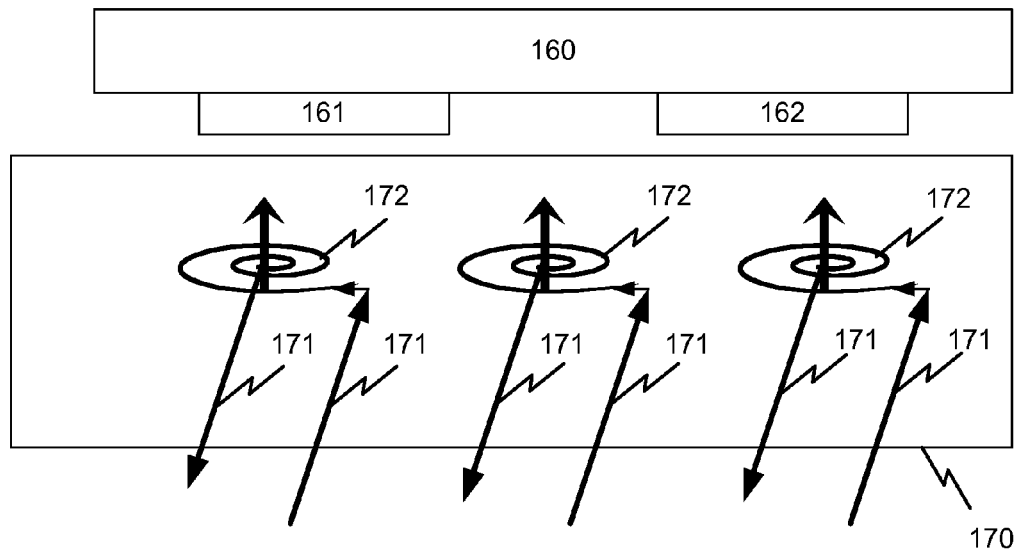
FIG. 4B

SYSTEMS AND METHODS FOR UBIQUITOUS CHARGING

TECHNICAL FIELD OF THE INVENTION

The invention relates to portable communication devices, and more particularly, to charging portable communication devices.

DESCRIPTION OF RELATED ART

Communication devices, such as mobile terminals, typically contain a rechargeable battery that allows the communication device to be portable. Conventionally, the rechargeable battery within these portable communication devices must be charged by connecting the communication device to a charging device, where the charging device requires an alternating current (AC) outlet. If a battery within a communication device needs recharging, a user must wait until he/she returns home to plug the communication device into the charging device which requires an AC outlet.

SUMMARY

According to one aspect, a communication device may be provided. The communication device may comprise a battery; a positive node and a negative node; and logic configured to: send a first signal through the positive node into a charging surface; send a second signal through the negative node into the charging surface; receive current through the positive and negative nodes from the charging surface in response to the first and second signals; and charge the battery with the received current from the charging surface.

Additionally, the positive node and negative node are in contact with the charging surface.

Additionally, the positive node further includes a plurality of nodes.

Additionally, the negative node further includes a plurality of nodes.

Additionally, the communication device may further comprise an electromagnetic sensor for receiving electromagnetic energy.

According to another aspect, a method may be provided. The method may comprise transmitting a first signal through a positive node of a device into a charging surface; transmitting a second signal through a negative node of the device into the charging surface; receive current through the positive and negative nodes of the device from the charging surface in response to the first and second signals; and charging a battery within the device with the received current from the charging surface.

Additionally, the method may further comprise determining that the battery requires charging.

Additionally, the method may further comprise determining that the battery is fully charged.

Additionally, the method may further comprise terminating the charging of the battery when it is determined that the battery is fully charged.

Additionally, the battery is used to provide the positive and negative signals through the positive and negative nodes of the device.

According to another aspect, a method is provided. The method may comprise receiving a first signal from a device; determining a number of positive electrodes that received the first signal; receiving a second signal from the device; determining a number of negative electrodes that received the second signal; and supplying a charging circuit for the device using the determined number of positive electrodes and the determined number of negative electrodes.

Additionally, the positive and negative electrodes are located on a surface.

Additionally, the device includes a battery, where the battery is charged by current through the determined number of positive electrodes to the device and charged by the current through the determined number of negative electrodes to the device.

Additionally, the determined number of positive electrodes are selected from a plurality of electrodes.

Additionally, the determined number of negative electrodes are selected from a plurality of electrodes.

According to another aspect, a device may be provided. The device may comprise a plurality of electrodes for transmitting current; and logic configured to: receive a first signal through a number of the plurality of the electrodes from an external device; determine that the number of the plurality of the electrodes that received the first signal are positive electrodes; receive a second signal through a number of the plurality of the electrodes from an external device; determine that the number of the plurality of the electrodes that received the second signal are negative electrodes; and supply charging current to the external device via the determined number of positive and negative electrodes.

Additionally, the plurality of electrodes comprise at least one of nano-wires or nano-structures.

Additionally, the charging current is supplied from a power source external to the device.

Additionally, the device comprises at least one of a rigid surface, a flexible surface or a cloth surface.

According to another aspect, a flexible surface may be provided. The flexible surface may comprise a plurality of electrodes for transmitting electrical current and a plurality of coils, where the plurality of coils are connected to the plurality of electrodes and radiate electromagnetic energy produced from electrical current received from the plurality of electrodes, where the radiated electromagnetic energy charges an external device located in close proximity to the flexible surface.

BRIEF DESCRIPTION OF THE DRAWINGS

The accompanying drawings, which are incorporated in and constitute a part of this specification, illustrate embodiments and, together with the description, explain the embodiments. In the drawings:

FIGS. 4A and 4B illustrate exemplary embodiments of charging surfaces;

DETAILED DESCRIPTION OF THE INVENTION

The following detailed description of the embodiments refers to the accompanying drawings. The same reference numbers in different drawings may identify the same or similar elements. Also, the following detailed description does not limit the embodiments.

Figure 1:
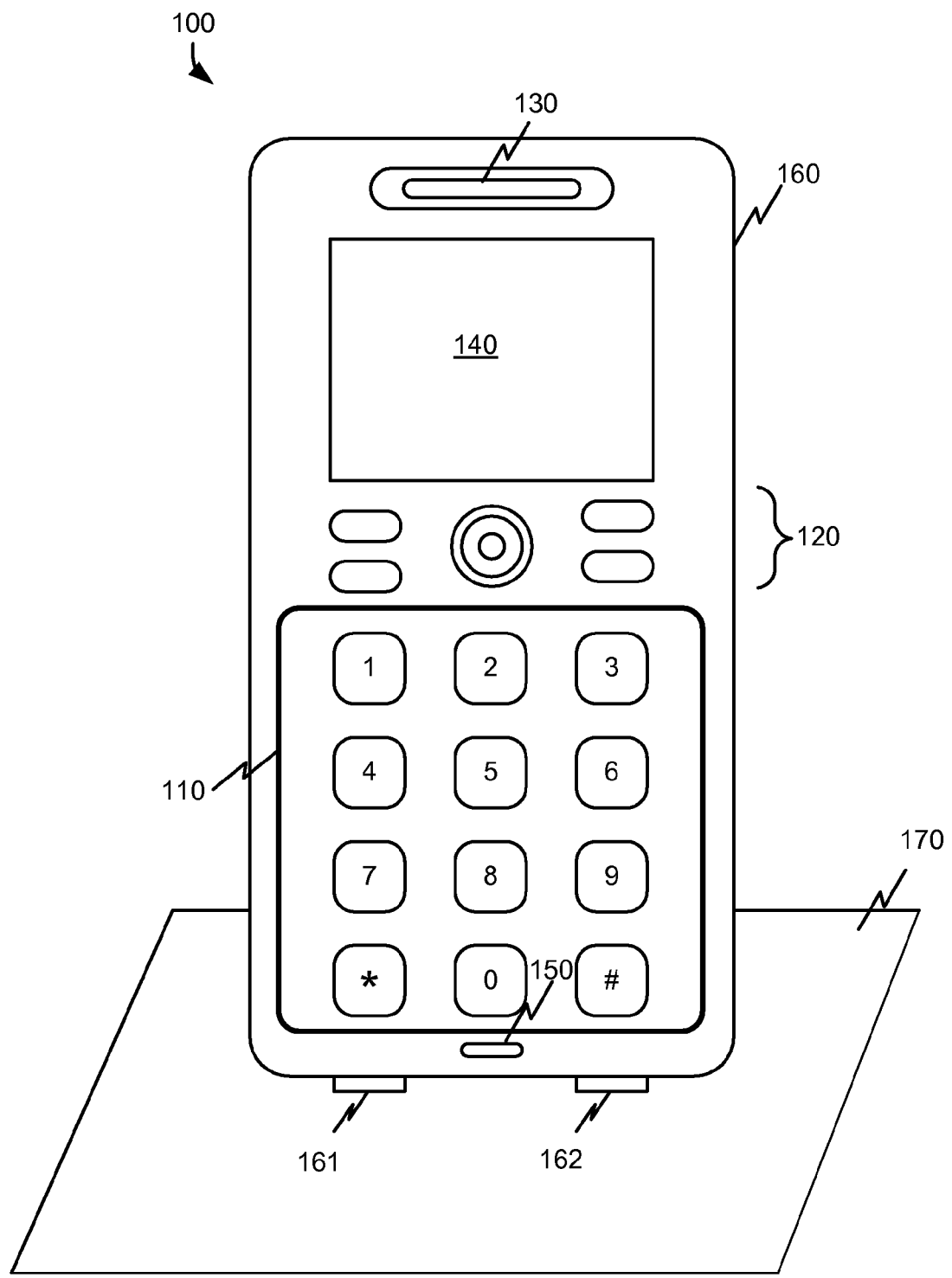
FIG. 1 is a diagram of an exemplary communication device.

FIG. 1 is a diagram of an exemplary implementation of a communication device. Communication device 100 may be a mobile communication device. As used herein, a "communication device" and/or "communication terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; a palmtop receiver and/or another type of communication device. In further examples, "communication device" 100 may also include any other type of portable electronic device, such as an MP3 player, that may have limited forms of "communication" or none at all.

Communication device 100 may include keypad 110, control keys 120, speaker 130, display 140 and microphone 150 within housing 160. Housing 160 may also include positive node 161 and negative node 162 configured to contact and receive a charge from charging surface 170.

Keypad 110 may include devices and/or logic that can be used to operate communication device 100. Keypad 110 may further be adapted to receive user inputs, directly or via other devices, such as a stylus for entering information into communication device 100. In one implementation, communication functions of communication device 100 may be controlled by activating keys in keypad 110. Implementations of keys may have key information associated therewith, such as numbers, letters, symbols, etc. The user may operate keys in keypad 110 to place calls, enter digits, commands, and text messages, into communication device 100. Designated functions of keys may form and/or manipulate images that may be displayed on display 140.

Control keys 120 may include buttons that permit a user to interact with communication device 100 to cause communication device 100 to perform specified actions, such as to interact with display 140, etc.

Speaker 130 may include a device that provides audible information to a user of communication device 100. Speaker 130 may include multiple speakers that may be located anywhere on communication device 100, where one speaker may function, for example, as an earpiece when a user communicates using communication device 100. Speaker 130 may also include a digital to analog converter to convert digital signals into analog signals. Speaker 130 may also function as an output device for providing a ringing signal indicating that an incoming call is being received by communication device 100.

Display 140 may include a device that provides visual images to a user. For example, display 140 may provide graphic information regarding incoming/outgoing calls, text messages, games, phonebooks, the current date/time, volume settings, etc., to a user of communication device 100. Implementations of display 140 may be implemented as black and white or color flat panel displays.

Microphone 150 may include a device that converts speech or other acoustic signals into electrical signals for use by communication device 100. Microphone 150 may also include an analog to digital converter to convert inputted analog signals into digital signals. Microphone 150 may be located anywhere on communication device 100 and may be configured, for example, to convert spoken words or phrases into electrical signals for use by communication device 100.

Housing 160 may include a structure configured to hold devices and components used in communication device 100. For example, housing 160 may be formed from plastic, metal, or composite and may be configured to support keypad 110, control keys 120, speaker 130, display 140 and microphone 150. Housing 160 may also include positive node 161 and negative node 162 used to contact a charging surface 170. Nodes 161 and 162 may include electrical contacts for transmitting electrical current, for example.

Charging surface 170 may include a surface that includes electrodes that may transmit charging current to a device. For example, charging surface 170 may supply charging current to a battery within communication device 100 via positive node 161 and negative node 162.

Figure 2:
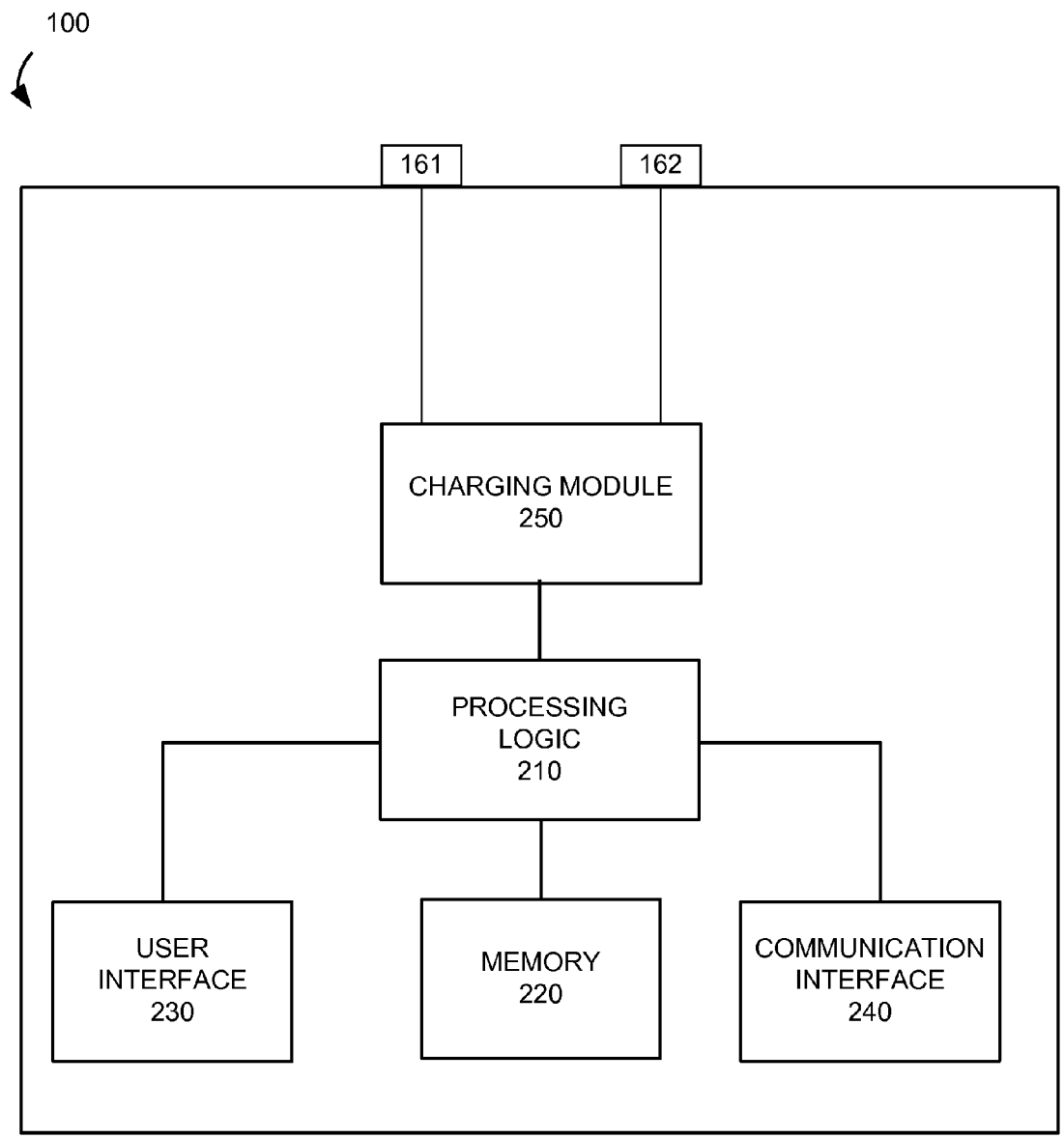
FIG. 2 illustrates an exemplary functional diagram of the communication device of FIG. 1.

FIG. 2 illustrates an exemplary functional diagram of a communication device, such as communication device 100, consistent with the invention. As shown in FIG. 2, communication device 100 may include processing logic 210, memory 220, user interface 230, communication interface 240 and charging module 250. Positive node 161 and negative node 162 may connect to charging module 250.

Processing logic 210 may include a processor, microprocessor, an application specific integrated circuit (ASIC), field programmable gate array (FPGA), or the like. Processing logic 210 may include data structures or software programs to control operation of communication device 100 and its components. Implementations of communication device 100 may use an individual processing logic component or multiple processing logic components, such as processing logic components operating in parallel.

Memory 220 may include a random access memory (RAM), a read only memory (ROM), and/or another type of memory to store data and instructions that may be used by processing logic 210.

User interface 230 may include mechanisms, such as hardware and/or software, for inputting information to communication device 100 and/or for outputting information from communication device 100, such as display 140 and keypad 110.

Communication interface 240 may include, for example, a transmitter that may convert base band signals from processing logic 210 to radio frequency (RF) signals and/or a receiver that may convert RF signals to base band signals. Alternatively, communication interface 240 may include a transceiver to perform functions of both a transmitter and a receiver. Communication interface 240 may connect to an antenna assembly (not shown) for transmission and reception of the RF signals. Antenna assembly may include one or more antennas to transmit and receive RF signals over the air. Antenna assembly may receive RF signals from communication interface 240 for transmitting over the air, and receive RF signals over the air for conveying to communication interface 240.

Charging module 250 may include mechanisms, such as hardware and/or software, for controlling charging of a rechargeable battery within communication device 100. For example, charging module 250 may control current supplied (from charging surface 170) via positive node 161 and negative node 162 to a rechargeable battery. The rechargeable battery may be included in charging module 250. Alternately, the rechargeable battery may be located externally from charging module 250. As described in detail with respect to FIG. 3, charging module 250 may also send signals into charging surface 170 in order to enable a charging process.

As will be described in detail below, processing logic 210 and/or charging module 250 may perform certain operations relating to charging a battery within communication device 100. Communication device 100 may perform such operations in response to processing logic 210 and/or charging module 250 executing software instructions contained in a computer-readable medium, such as memory 220.

The software instructions may be read into memory 220 from another computer-readable medium or from another device via communication interface 240. The software instructions contained in memory 220 may cause processing logic 210 to perform processes that will be described later. Alternatively, hardwired circuitry may be used in place of or in combination with software instructions to implement processes consistent with the embodiments. Thus, implementations consistent with the principles of the embodiments are not limited to any specific combination of hardware circuitry and software.

Figure 3:
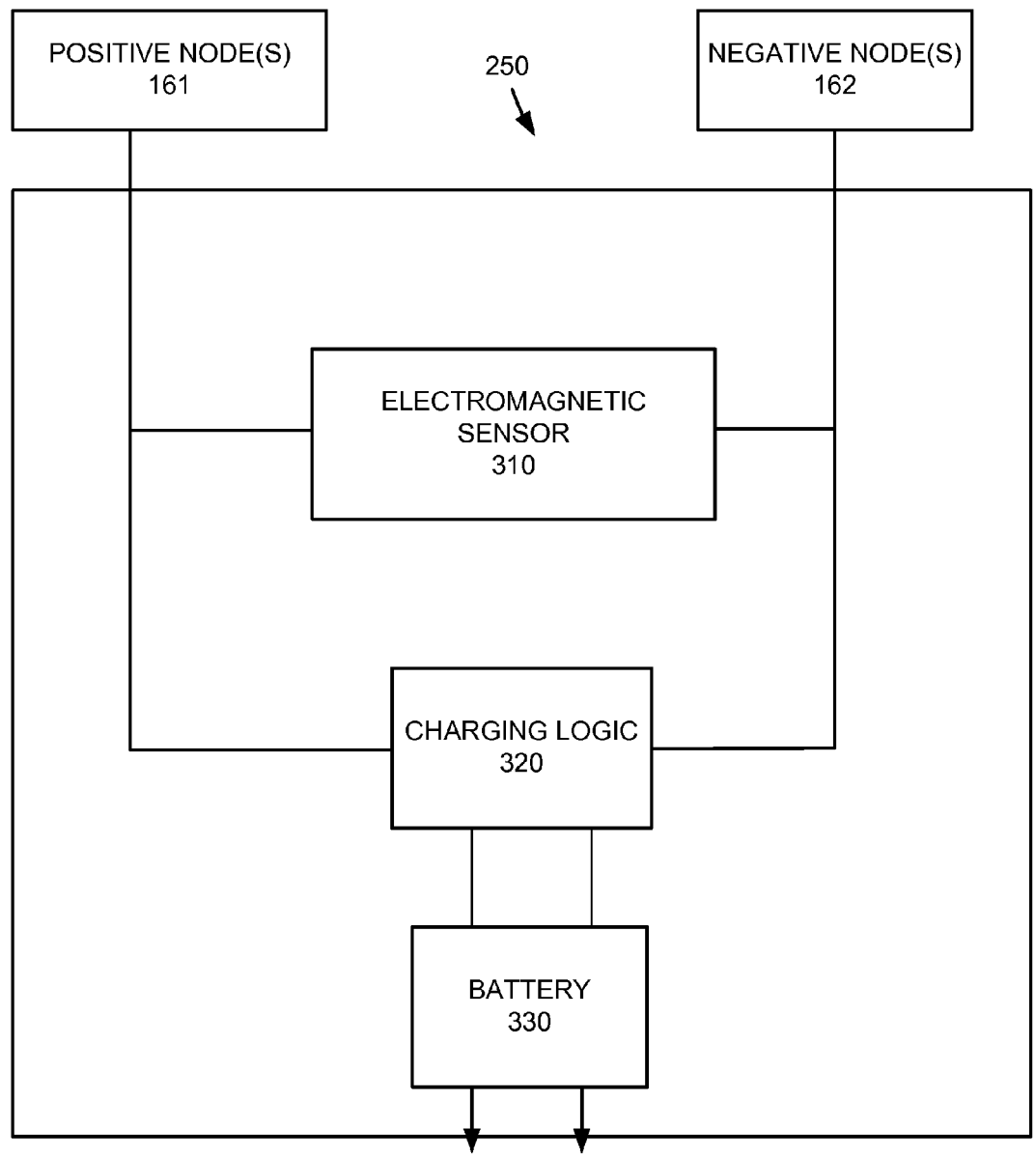
FIG. 3 illustrates an exemplary charging module of FIG. 2

FIG. 3 illustrates an exemplary diagram of charging module 250. As shown in FIG. 3, positive node(s) 161 and negative node(s) 162 may be connected to charging module 250. Charging module 250 may include electromagnetic sensor 310, charging logic 320 and battery 330.

In one embodiment, positive node 161 and negative node 162 may each be a single node, for example. In other embodiments, positive nodes 161 and negative nodes 162 may each include a large number of smaller nodes, for example.

Electromagnetic sensor 310 may include mechanisms, such as coils of wire that may be used for receiving electromagnetic energy. Electromagnetic sensor 310 may also convert the received electromagnetic energy into electrical current and provide the current to charging logic 320. In other examples, electromagnetic sensor 310 may be located on the surface of housing 160 of communication device 100, and in further examples, there may be a plurality of electromagnetic sensors 310 located on housing 160.

Figure 7:
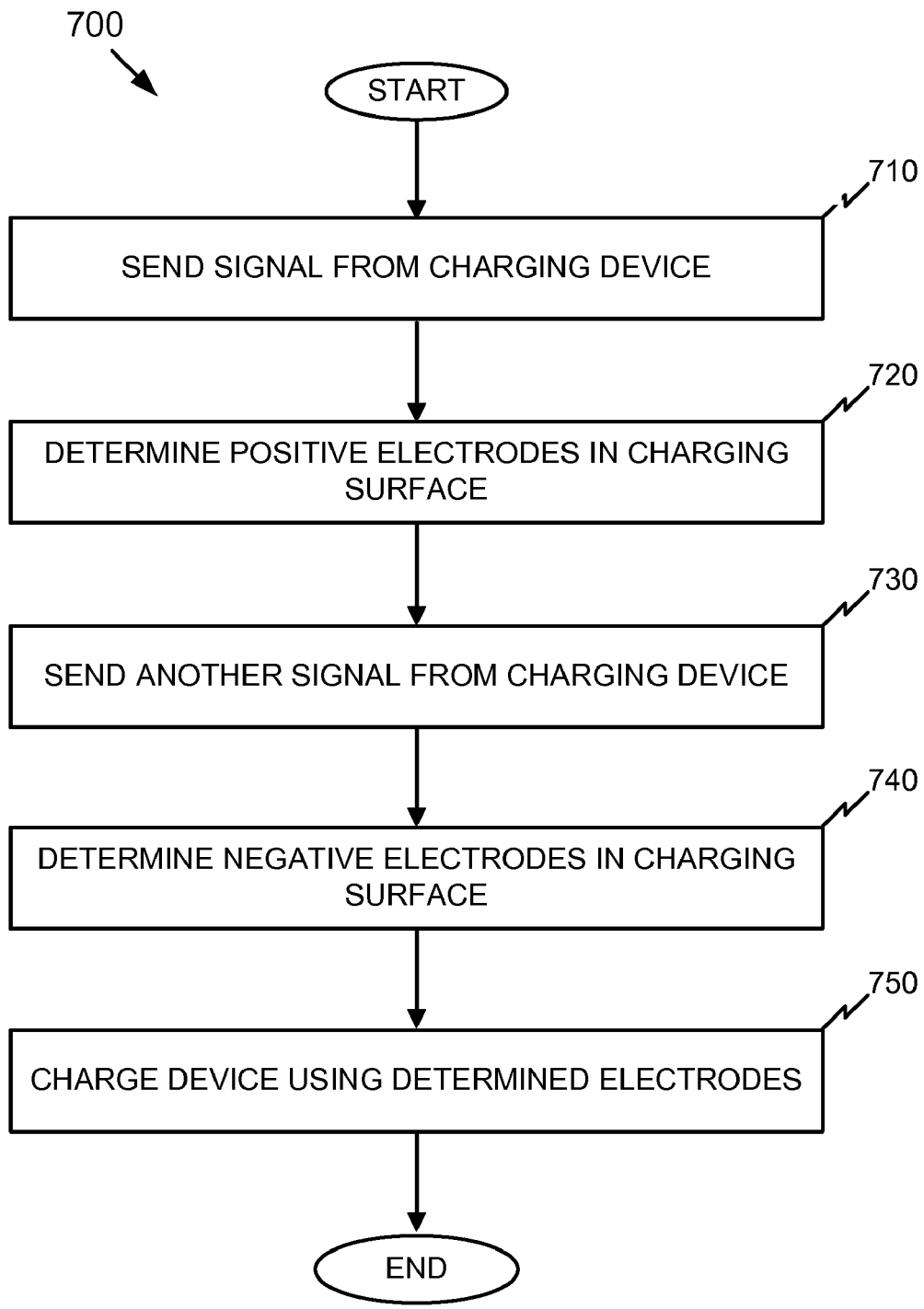
FIG. 7 illustrates an exemplary flow diagram of a charging process.
Figure 8:
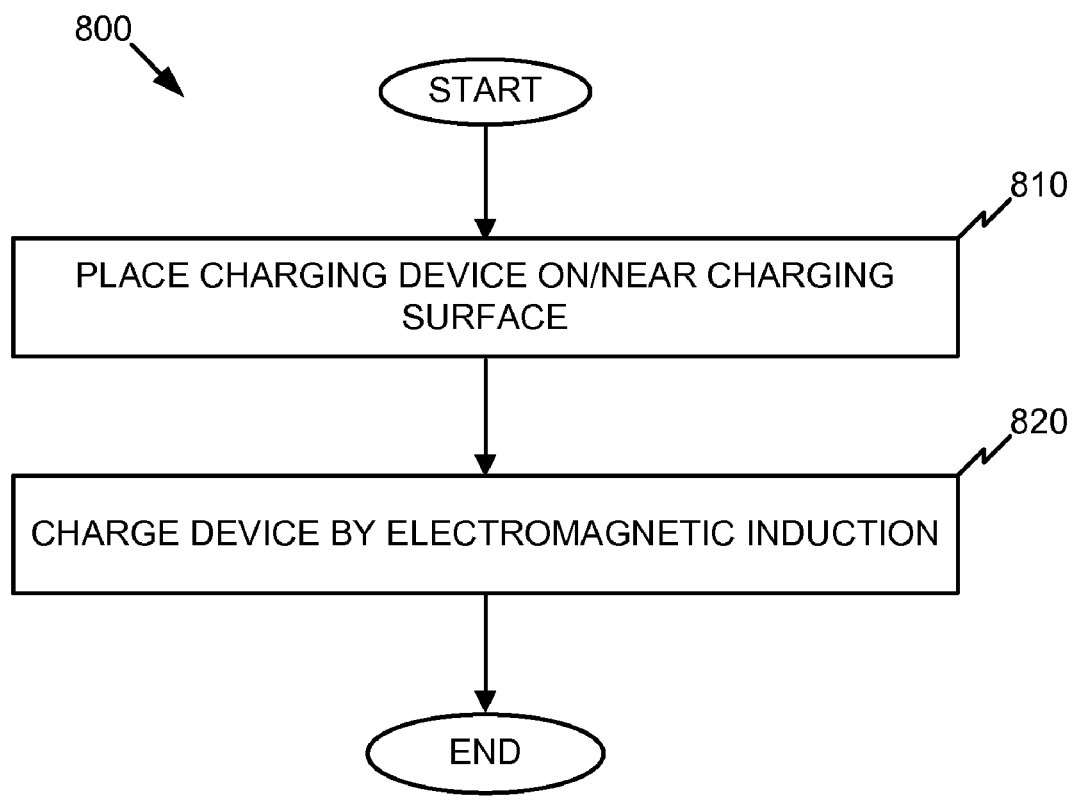
FIG. 8 illustrates an exemplary flow diagram of another charging process.

Charging logic 320 may include mechanisms, such as hardware and/or software, for controlling charging current to battery 330. For example, charging logic 320 may provide (using battery 330) a positive signal through positive node(s) 161 to a charging surface 170. Similarly, charging logic 320 may provide a negative signal through negative node(s) 162 to a charging surface 170. As will be described in more detail below, providing power to a charging surface 170 may enable a charging process (described below in FIG. 7), for example. Charging logic 320 may also sense a voltage and/or determine when battery 330 may require charging. Charging logic 320 may also sense and/or determine a short circuit (of a node or electrode) and/or when battery 330 is fully charged and may end a charging process upon detection of a short circuit and/or fully charged battery, for example. As will be described in detail below, charging logic 320 may use nodes 161 and 162 in a charging process shown in FIG. 7. Charging logic 320 may also use electromagnetic sensor 310 in a charging process shown in FIG. 8. In further examples, charging logic may also charge battery 330 using both processes (as shown in FIGS. 7 and 8) simultaneously.

Battery 330 may include any type of rechargeable battery. For example, battery 330 may include a lithium, nickel or cadmium type of battery. Battery 330 may connect to other components to supply power to components within communication device 100.

FIGS. 4A and 4B illustrate embodiments of charging surface 170. As shown in FIG. 4A for example, charging surface 170 may contact positive node 161 and negative node 162 located on housing 160 (of communication device 100). As shown in FIG. 4A, charging surface 170 may include a number of electrodes 171 (labeled 1 to 21).

Charging surface 170 may include any type of surface and/or material that includes electrodes 171 for providing charging current. For example, charging surface 170 may be a rigid surface (e.g., a desk-like surface), a flexible surface, such as plastic or a cloth material.

Electrodes 171 may include electrically conducting wires and/or elements. In one embodiment, electrodes 171 may include elements such as nano-structures or nano-wires that may conduct electricity. As shown in FIG. 4A, electrodes 171 (numbered 2-7) may contact positive node 161 and electrodes 171 (numbered 13-18) may contact negative node 162.

As shown in FIG. 4B for example, another embodiment of charging surface 170 may include a number of electrodes 171 and a number of coils 172.

Charging surface 170 may include any type of surface and/or material that includes electrodes 171 and wound coils 172 for providing charging current to an external device located within close proximity of charging surface 170. Charging surface 170 may be a rigid surface (e.g., a desk-like surface), a flexible surface or cloth-like material/surface.

Electrodes 171 may include electrically conducting wires and/or elements. In one embodiment, electrodes 171 may include elements such as nano-structures or nano-wires that may conduct electricity. As shown in FIG. 4B, electrodes 171 may provide current to coils 172.

Coils 172 may include a loop or coil of wire or a loop or coil of nano-wire, for example. Coils 172 may produce radiated electromagnetic energy (indicated by upward arrow) that may be received by an external device (e.g., communication device 100) when located in close proximity to charging surface 170.

Figure 5A:
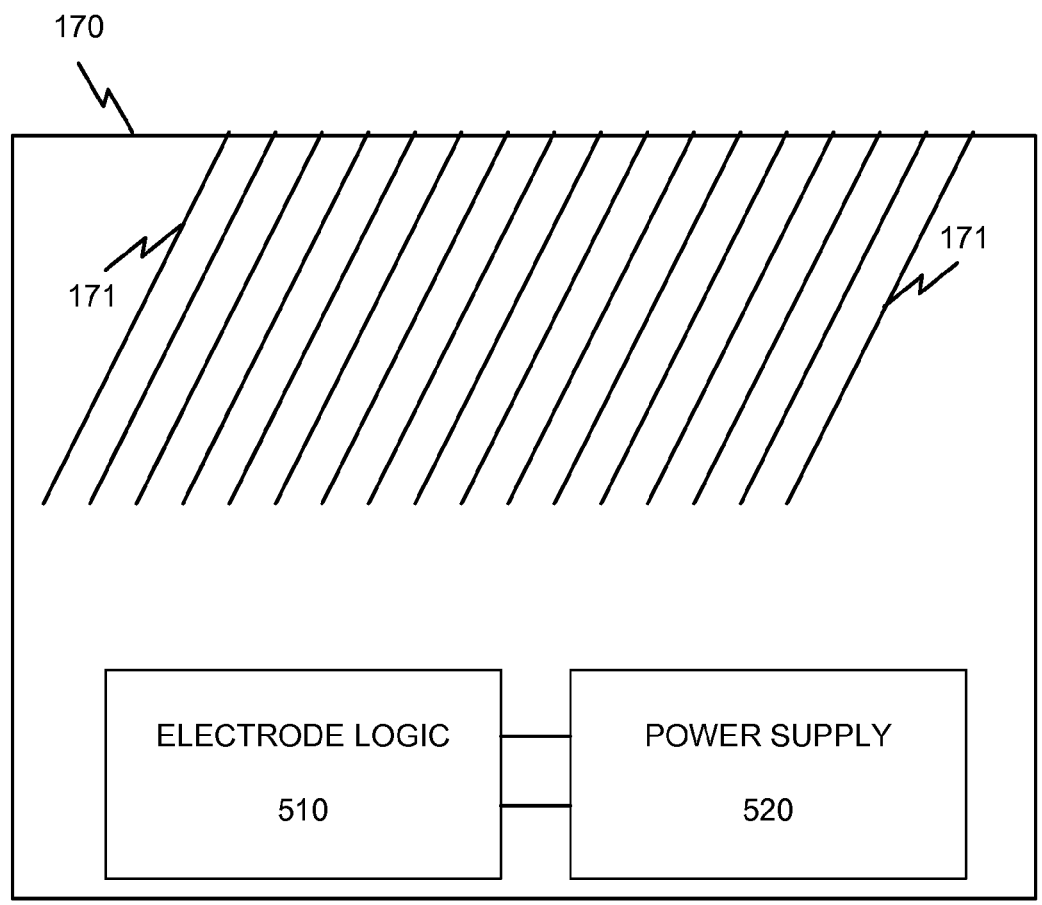
FIGS. 5A to 5C further illustrate exemplary charging surfaces.

FIG. 5A illustrates one embodiment of a charging surface 170. As shown in FIG. 5A, charging surface 170 may include electrodes 171, electrode logic 510 and power supply 520, for example.

Electrode logic 510 may include hardware and/or software for sensing, selecting and applying current through electrodes 171. For example, electrode logic 510 may sense positive current (provided from communication device 100) through a number of electrodes 171 (e.g., 2-7 as shown in FIG. 4A). Electrode logic 510 may then store information that identifies electrodes 2-7 as defining a positive node for a current charging path. Electrode logic 510 may then apply current (to a device to be charged, such as communication device 100) through the selected electrodes (2-7) without applying current to other (non selected) electrodes 171. Electrode logic 510 may connect to power supply 520 in order to provide power/current to selected electrodes 171, for example. Similarly, electrode logic 510 may sense negative current through a number of electrodes 171 and store this information to define or determine a negative node for a current charging path through charging surface 170. Electrode logic 510 may also turn off current through electrodes 171 if a short circuit is detected, for example.

Power supply 520 may include any type of power supply for supplying electrical current. For example, power supply 520 may include a battery or any other source of electrical power, such as an AC outlet.

Figure 5B:
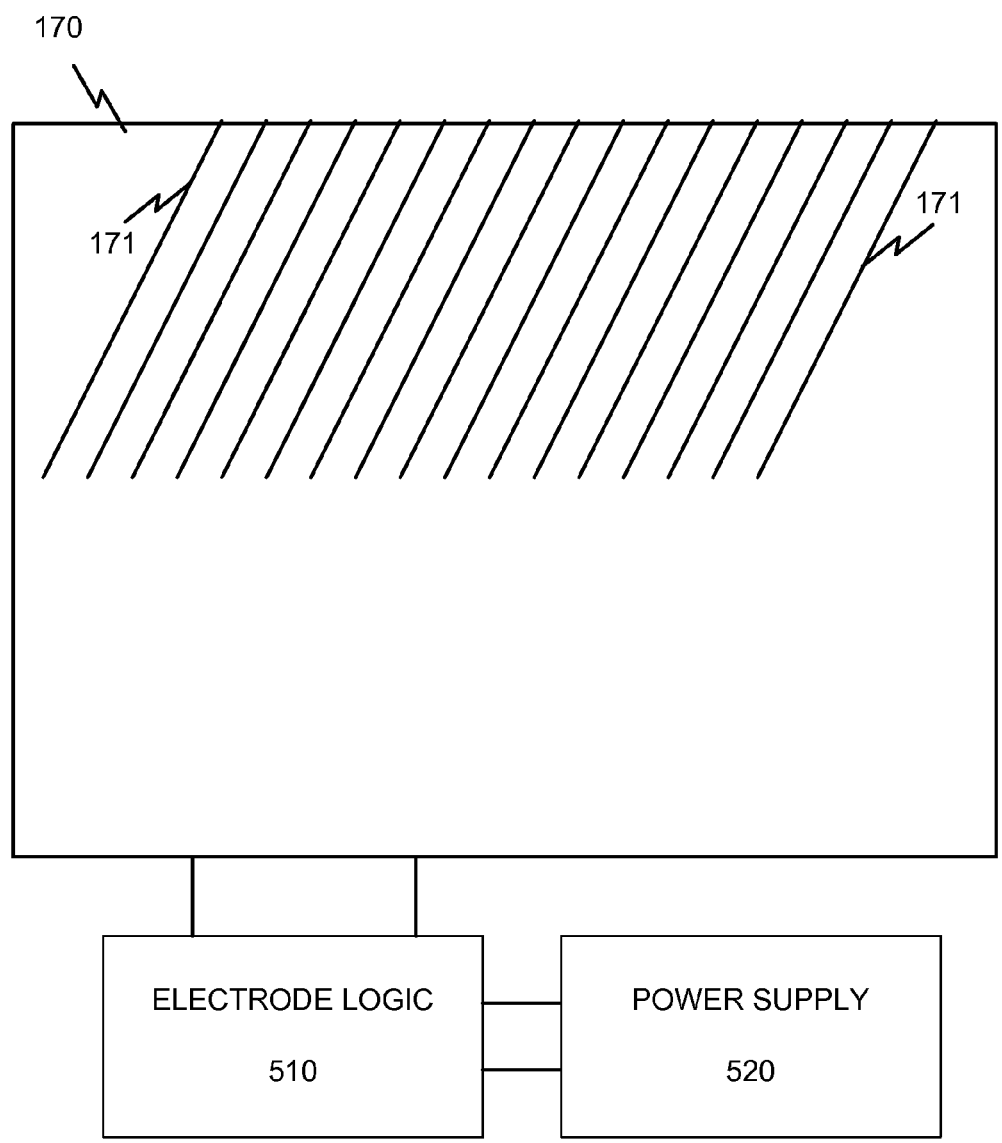

FIG. 5B illustrates another embodiment of charging surface 170. As shown in FIG. 5A, charging surface 170 may include a number of electrodes 171. In this embodiment, electrode logic 510 and power supply 520 may be located external to charging surface 170, for example. In the embodiment shown in FIG. 5B, electrodes 171, electrode logic 510 and power supply 520 may function in a similar manner as described above with reference to FIG. 5A. For example, electrodes 171 may connect to electrode logic 510 in order to sense signals received from communication device 100 and to supply power to communication device 100 via power supply 520.

Figure 5C:
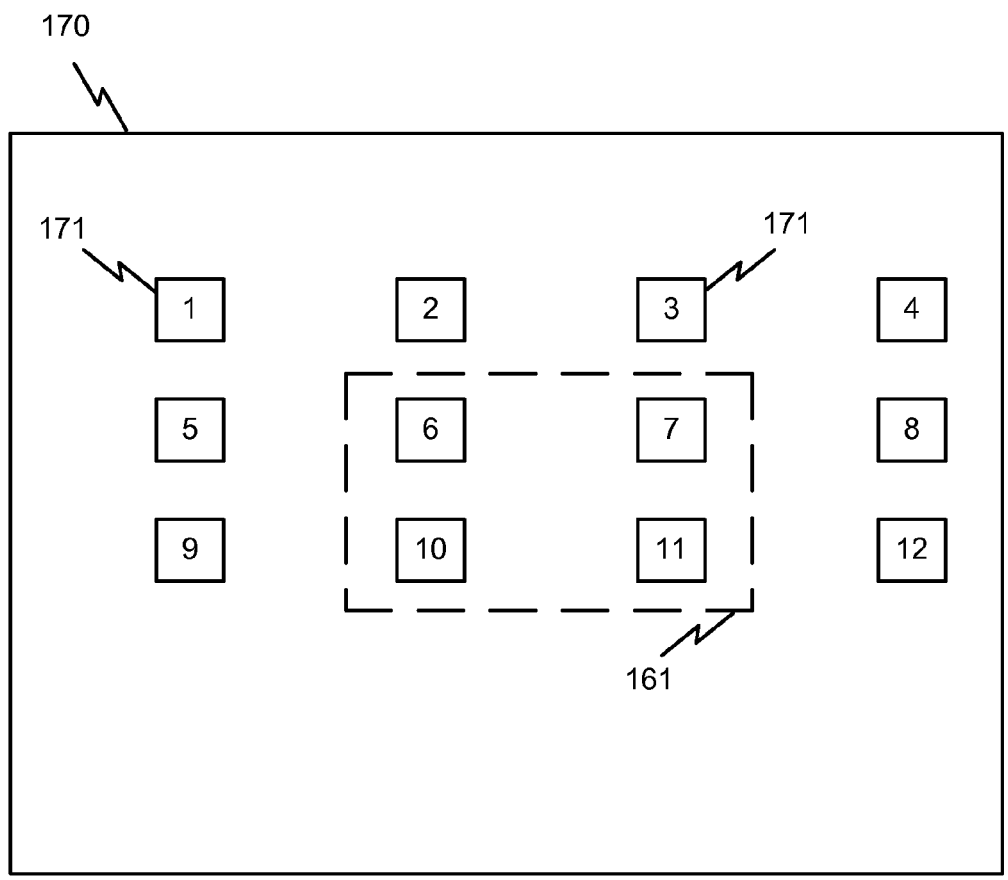

FIG. 5C illustrates a top view of charging surface 170. As shown, twelve electrodes 171 (numbered 1-12) may be present on charging surface 170. As shown, if communication device 100 was placed onto charging surface 170, the dashed line indicates an area where positive electrode 161 may contact charging surface 170. In this example, electrodes 6, 7, 10 and 11 may contact positive electrode 161. Although not shown, it should be understood that a number of electrodes 171 may contact a negative node 162 and define a negative current path node through charging surface 170. It should also be understood that due to the infinitesimal size of the nanowires or nano-structures that may be used to form electrodes 171, electrodes 171 may not be visible to the naked eye. In other examples, patterns of electrodes 171 may be specifically designed to contact specifically designed nodes (such as 161 and 162) on charging devices.

Figure 6:
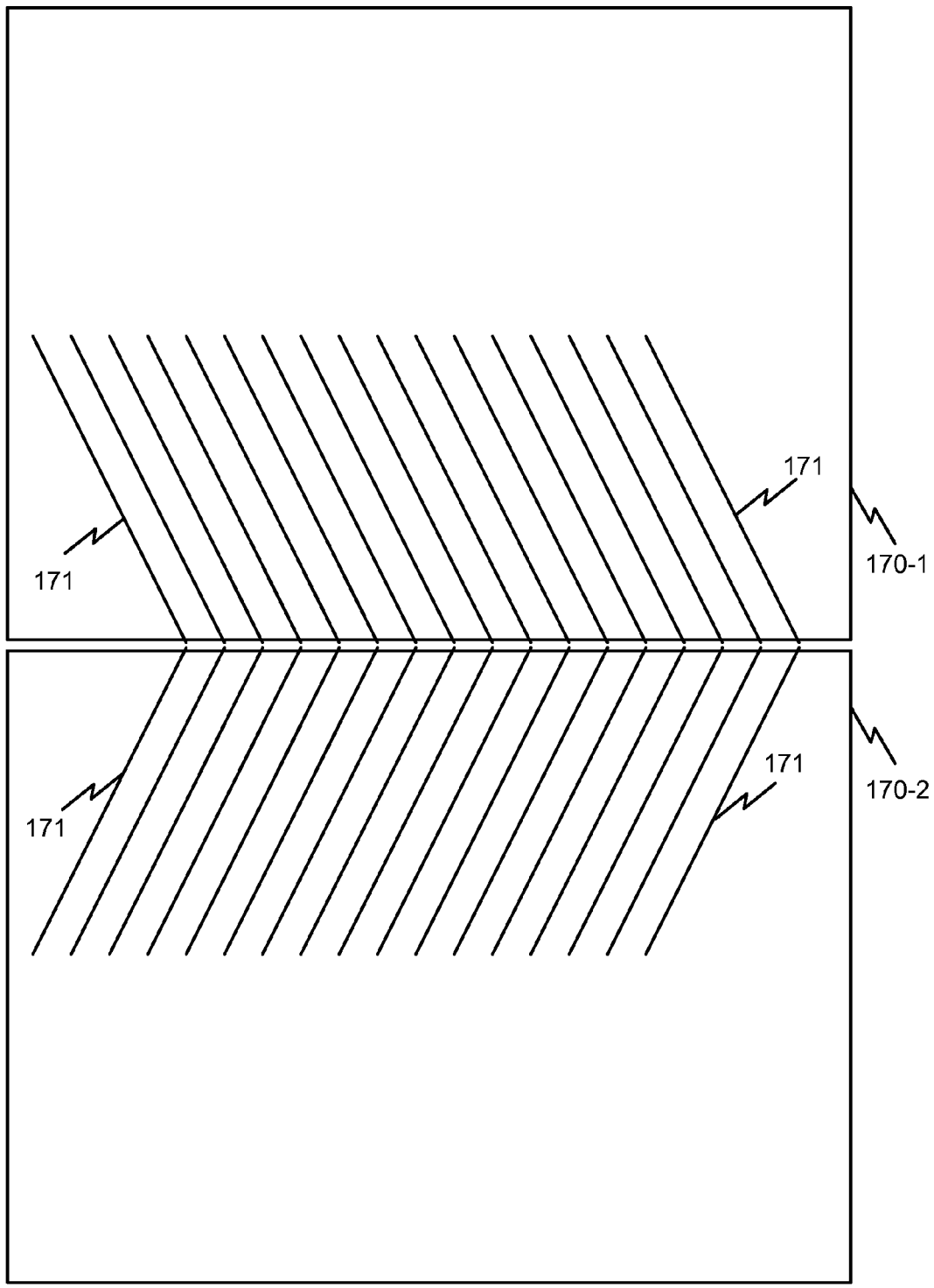
FIG. 6 illustrates exemplary charging surfaces in contact with one another.

FIG. 6 illustrates two charging surfaces 170-1 and 170-2 in contact with another. As shown in FIG. 6 for example, charging surface 170-1 and 170-2 may be placed in contact with one another. As described above, electrodes 171 may conduct electrical current through charging surfaces 170-1 and 170-2. Electrodes 171 may pass current from charging surface 170-1 to charging surface 170-2 when electrodes 171 are in contact with one another. In further examples, there may be any number of additional charging surfaces in contact with charging surfaces 170-1 and 170-2 to which charging current may be supplied via electrodes 171.

In other embodiments, charging surface 170-2 may be located on an external device (e.g., communication device 100). In this example, electrodes 171 within surface 170-2 may connect to positive nodes 161 and negative nodes 162 in order to charge a battery in communication device 100.

FIG. 7 is a flowchart of an exemplary charging process 700. Process 700 may begin when a charging device (communication device 100) is placed in contact with charging surface 170 and sends a signal (block 710). For example, charging logic 320 may send a positive signal (e.g., using the positive terminal of battery 330) to positive node(s) 161. As shown in FIG. 4A for example, some electrodes 171 within charging surface 170 may contact positive node(s) 161 of communication device 100. The electrodes 171 that contact positive node(s) 161 may transmit current to electrode logic 510, and electrode logic 510 may determine which of electrodes 171 will be used to carry provide current to charge battery 330 (block 720). Again referring to FIG. 4A, electrodes 171 (numbered 2-7) may be determined to contact positive node(s) 161 by electrode logic 510.

Process 700 may continue when a charging device (communication device 100) sends another signal (block 730). For example, charging logic 320 may send a second signal (e.g., using the negative terminal of battery 330) to negative node(s) 162. As shown in FIG. 4A for example, some electrodes 171 within charging surface 170 may contact negative node(s) 162 of communication device 100. The electrodes 171 that contact negative node(s) 162 may transmit current to electrode logic 510, and electrode logic 510 may determine which of electrodes 171 will be used to carry current and complete the charging loop (block 740). Again referring to FIG. 4A, electrodes 171 (numbered 13-18) may be determined to contact negative node(s) 162 by electrode logic 510.

After electrode logic 510 determines which of electrodes 171 may contact positive node(s) 161 and which of electrodes 171 may contact negative node(s) 162, the device may be charged using the determined electrodes (block 750). For example, electrode logic 510 may connect a positive terminal of power supply 520 to the electrodes 171 that are determined to contact positive node(s) 161. Similarly, electrode logic 510 may connect a negative terminal of power supply 520 to the electrodes 171 that are determined to contact negative node(s) 162. As shown in FIG. 4A for example, electrodes 171 (numbered 8-12) may not be selected to carry current. In this manner, battery 330 of communication device 100 may receive positive current at terminal 162, which is used to charge communication device 100 and is routed through device 100 to negative terminal 162. As described above, charging logic 320 may sense when battery 330 is fully charged and may disconnect battery 330 and/or end charging process 700 when battery 330 is fully charged.

FIG. 8 is a flowchart of another exemplary charging process 800 using a charging surface as described in FIG. 4B for example. The exemplary charging process 800 may begin when a device to be charged is placed on/near a charging surface (block 810). For example, a communication device 100 may be placed in close proximity to charging surface 170. As shown in FIG. 4B for example, coils 172 may radiate electromagnetic energy from charging surface 170. When a device (communication device 100) is on or near charging surface 170, the device may be charged by electromagnetic induction (block 820). For example, electromagnetic sensor(s) 310 (located on or within communication device 100) may receive energy (from charging surface 170) and may provide current to charging logic 320, where the current may be provided from charging logic 320 to battery 330 (block 820). As described above, charging logic 320 may sense or determine a fully charged battery 330, and may end charging process 800 upon detection of a fully charged battery 330.

Figure 9:
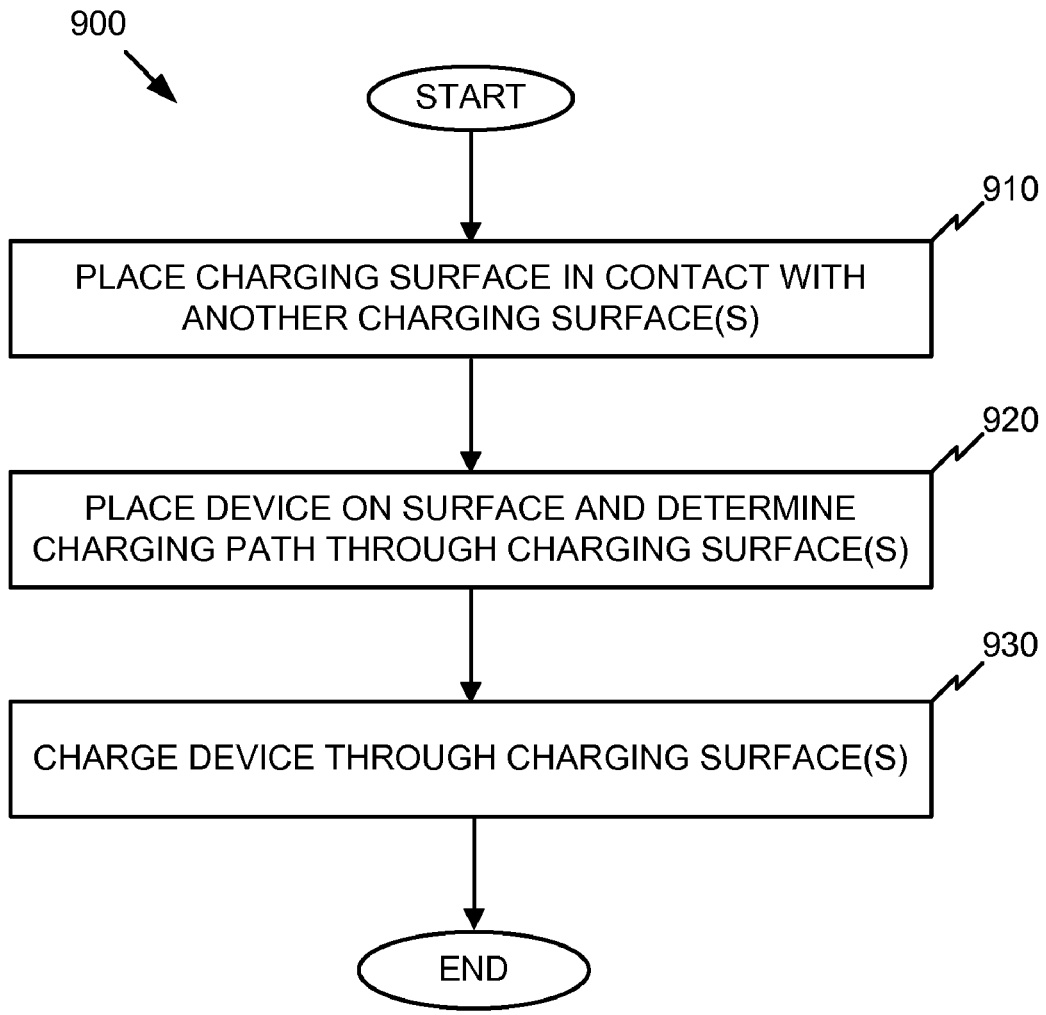
FIG. 9 illustrates an exemplary flow diagram of another charging process.

FIG. 9 is a flowchart of another exemplary charging process 900 using charging surfaces 170 as shown in FIG. 4A, for example. Exemplary charging process 900 may begin by placing a charging surface 170 in contact with another charging surface(s) 170 (block 910). As shown in FIG. 6 for example, electrodes 171 included in charging surface 170-1 may contact electrodes 171 included in charging surface 170-2. Also, any number of additional charging surfaces may be placed in contact with charging surfaces 170-1 and 170-2. Contacting electrodes 171 may form a charging path to nodes 161 and 162 of communication device 100 through any number of charging surfaces 170.

In one example, the shirt and pants of a user, a chair the user is sitting in and the floor may be made up from a number of charging surfaces 170. The floor may connect to an AC outlet in the user's home for example. In this example, if communication device 100 is in the shirt pocket of the user, electrodes 171 included in the shirt, pants, chair and floor may be coupled to the AC outlet. When a device (e.g. communication device 100) is placed on any of the number of charging surfaces 170, the device may determine a charging path through the charging surfaces 170 (block 920). For example, enacting a process as shown in blocks 710-740 of FIG. 7, a communication device 100 may send a signal to determine positive electrodes 171 through the charging surfaces (blocks 710 and 720) and then may send a signal though the charging surfaces 170 to determine negative electrodes 171 (blocks 730 and 740). In this example, positive electrodes 171 may connect from the user's shirt to/through the user's pants to/through the chair and to/through the floor to an AC outlet. Positive electrodes 171 in charging surface 170 may then be electrically coupled to positive node 161. Similarly, negative electrodes 171 may connect from the user's shirt to/through the user's pants to/through the chair and to/through the floor to an AC outlet. Negative electrodes 171 in charging surface 170 may then be electrically coupled to negative node 162. Once the positive and negative charging paths of electrodes 171 have been determined, battery 330 within communication device 100 may be charged via the charging surfaces 170 (block 930).

CONCLUSION

Implementations consistent with principles of the embodiments may provide ubiquitous charging of portable devices.

The foregoing description of preferred embodiments of the embodiments provides illustration and description, but is not intended to be exhaustive or to limit the embodiments to the precise form disclosed. Modifications and variations are possible in light of the above teachings or may be acquired from practice of the embodiments.

While series of acts have been described with regard to FIGS. 7-9, the order of the acts may be modified in other implementations consistent with the principles of the embodiments. Further, non-dependent acts may be performed in parallel.

It will be apparent to one of ordinary skill in the art that aspects of the embodiments, as described above, may be implemented in many different forms of software, firmware, and hardware in the implementations illustrated in the figures. The actual software code or specialized control hardware used to implement aspects consistent with the principles of the embodiments is not limiting of the embodiments. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A communication device comprising:
a battery;
a positive node and a negative node;
an electromagnetic sensor to receive electromagnetic energy from a charging surface and to convert the electromagnetic energy to a first current; and
a processor to:
send a first control signal through the positive node into a first portion of the charging surface,
send a second control signal through the negative node into a second portion of the charging surface,
receive the first current from the electromagnetic sensor,
receive, in response to sending the first control signal and the second control signal, a second current through the positive node from the first portion of the charging surface and through the negative node from the second portion of the charging surface, and
charge the battery with the first current from the electromagnetic sensor and the received second current from the charging surface.

2. The communication device of claim 1, where the positive node and negative node are in contact with the charging surface.

3. The communication device of claim 1, where the positive node further includes:
a plurality of nodes.

4. The communication device of claim 1, where the negative node further includes:
a plurality of nodes.

5. A method comprising:
receiving, at a device, electromagnetic energy from a charging surface;
converting the received electromagnetic energy to a first current;
transmitting a first control signal through at least one positive node of the device into the charging surface;
transmitting a second control signal through at least one negative node of the device into the charging surface;
receiving a second current through the at least one positive node and the at least one negative node of the device from the charging surface in response to transmitting the first control signal and the second control signal; and
charging a battery within the device with the first current and the received second current from the charging surface.

6. The method of claim 5, further comprising:
sensing a voltage of the battery; and
determining that the battery requires charging.

7. The method of claim 5, further comprising:
determining that the battery is fully charged; and
terminating the charging of the battery that is determined to be fully charged.

8. The method of claim 5, further comprising:
detecting a short circuit; and
terminating the charging of the battery when the short circuit is detected.

9. A method comprising:
supplying, via a charging surface, to a device with a battery, where the electromagnetic energy is to enable the device to charge the battery;
receiving, at the charging surface, a first control signal from the device;
determining positive electrodes, in the charging surface, that received the first control signal;
receiving, at the charging surface, a second control signal from the device;
determining negative electrodes, in the charging surface, that received the second control signal; and
providing, by a charging circuit that includes the determined positive electrodes and the determined negative electrodes, a current to the device to charge the battery.

10. The method of claim 9, where the determined positive electrodes are selected from a plurality of electrodes.

11. The method of claim 10, where the determined negative electrodes are selected from the plurality of electrodes.

12. A device comprising:
a plurality of first electrodes;
one or more coils being connected to the plurality of first electrodes and being to radiate electromagnetic energy produced from current transmitted from the plurality of first electrodes, where the radiated electromagnetic energy enables a first charging current in an external device located in close proximity to the one or more coils;

a plurality of second electrodes; and a processor to:

receive via a first number of the plurality of the second electrodes, a first control signal from the external device;

determine that the first number of the plurality of the second electrodes, that received the first control signal, are positive electrodes;

receive, via a second number of the plurality of the second electrodes, a second control signal from the external device;

determine that the second number of the plurality of the second electrodes, that received the second control signal, are negative electrodes; and supply a second charging current to the external device via the determined positive electrodes and the determined negative electrodes.

13. The device of claim 12, where the plurality of second electrodes include at least one of nano-wires or nano-structures.

14. The device of claim 12, where the charging current is supplied from a power source external to the device.

15. The device of claim 14, where the device further comprises at least one of a flexible surface or a cloth surface.

16. The communication device of claim 1, where the processor is further to:

sense a voltage of the battery; and determine that the battery requires charging based on the sensed voltage of the battery.

17. The communication device of claim 1, where the processor is further to:

determine that the battery is fully charged; and terminate the charging of the battery that is determined to be fully charged.

18. The communication device of claim 1, where the processor is further to:

detect a short circuit; and terminate the charging of the battery when the short circuit is detected.

19. The device of claim 12, where each of the one or more coils include nano-wires.

20. The device of claim 12, comprising:

a first surface that includes the plurality of second electrodes; and at least one second surface, each of the at least one second surface including a plurality of third electrodes, and the at least one second surface being positioned between the first surface and the external device, where the plurality of third electrodes, in each of the at least one second surface, transmit the supplied second charging current between the first surface and the external device.

\* \* \* \* \*

UNITED STATES PATENT AND TRADEMARK OFFICE
CERTIFICATE OF CORRECTION

PATENT NO.            : 7,973,513 B2                                    Page 1 of 1
APPLICATION NO.   : 11/930882
DATED                    : July 5, 2011
INVENTOR(S)          : Anders Wihlborg and Jonas Claesson It is certified that error appears in the above-identified patent and that said Letters Patent is hereby corrected as shown below:

Column 10, line 45, after "supplying, via a charging surface," and before "to a device with a battery" please insert --electromagnetic energy--.

Signed and Sealed this
Twenty-seventh Day of September, 2011

David J. Kappos
*Director of the United States Patent and Trademark Office*